United States Patent [19]
Yanagisawa

[11] Patent Number: 5,877,884
[45] Date of Patent: Mar. 2, 1999

[54] LIGHT SCANNING DEVICE

[75] Inventor: Katsuyuki Yanagisawa, Iwatsuki, Japan

[73] Assignee: Fuji Xerox Co., Ltd., Japan

[21] Appl. No.: 774,334

[22] Filed: Dec. 27, 1996

[30]     Foreign Application Priority Data

Dec. 29, 1995   [JP]   Japan ..................................... 7-354986

[51] Int. Cl.⁶ .................................................. G02B 26/08
[52] U.S. Cl. ........................... 359/198; 359/212; 359/226
[58] Field of Search ..................................... 359/196–200, 359/212–221, 223–226, 554–556; 347/263, 245

[56]                References Cited

U.S. PATENT DOCUMENTS 4,387,971   6/1983   Grove et al. ............................. 359/555
5,097,356   3/1992   Paulsen ..................................... 359/196
5,210,636   5/1993   Baer ......................................... 359/200

FOREIGN PATENT DOCUMENTS 7-84203   3/1995   Japan .

*Primary Examiner*—James Phan
*Attorney, Agent, or Firm*—Finnegan, Henderson, Farabow, Garrett & Dunner, L.L.P.

[57]                ABSTRACT

A light scanning device includes: a light deflector deflecting and scanning light modulated by an image signal, and a member to which the light deflector is connected, wherein a portion of the member has an elastically deformable portion, a mass body is mounted to the elastically deformable portion, and a dynamic vibration absorber is formed by the elastically deformable portion and the mass body. Vibrations of the light scanning device can be reduced by the dynamic vibration absorber formed by the elastically deformable portion and the mass body. Image imperfections caused by the vibrations can be prevented.

12 Claims, 10 Drawing Sheets

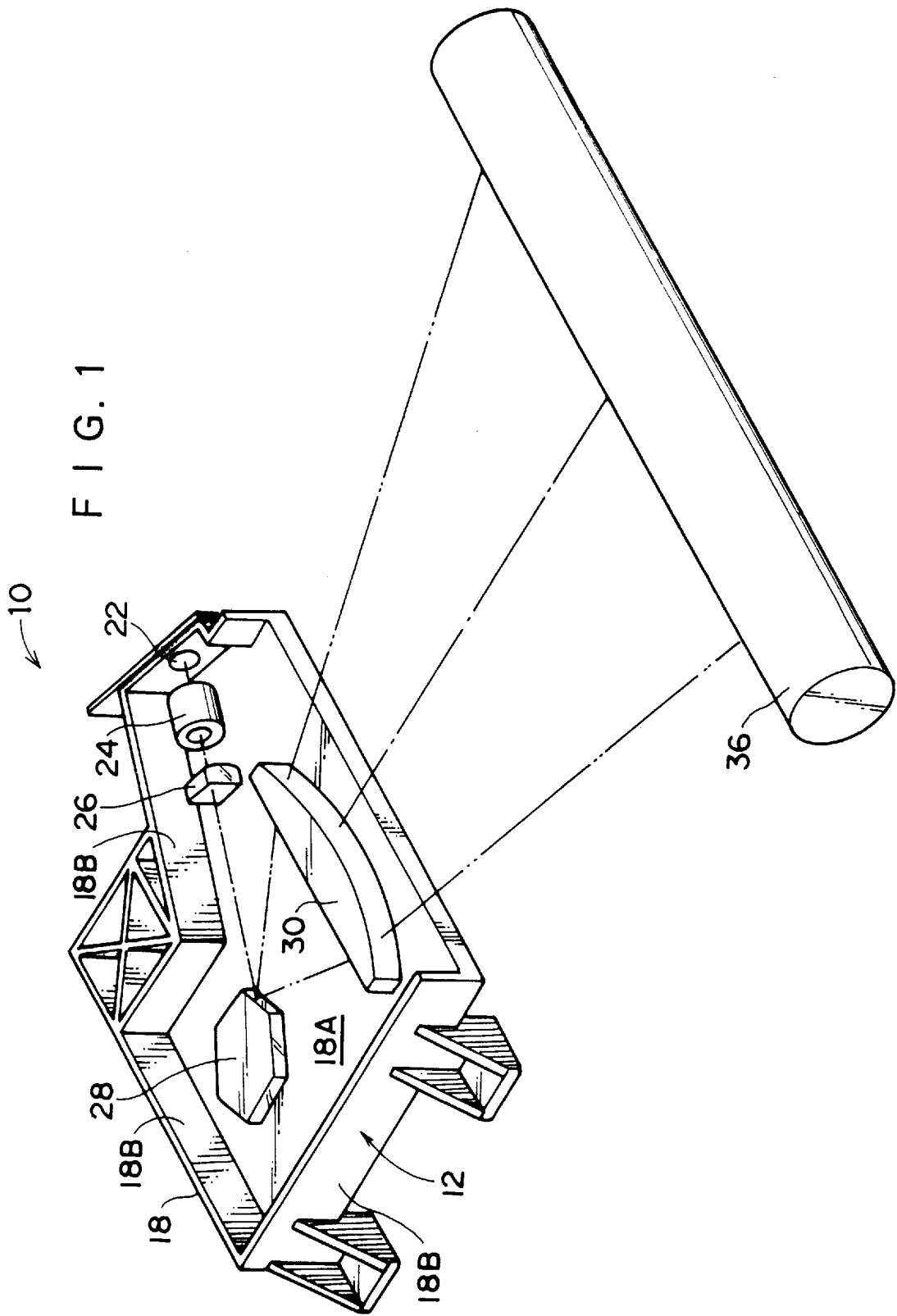

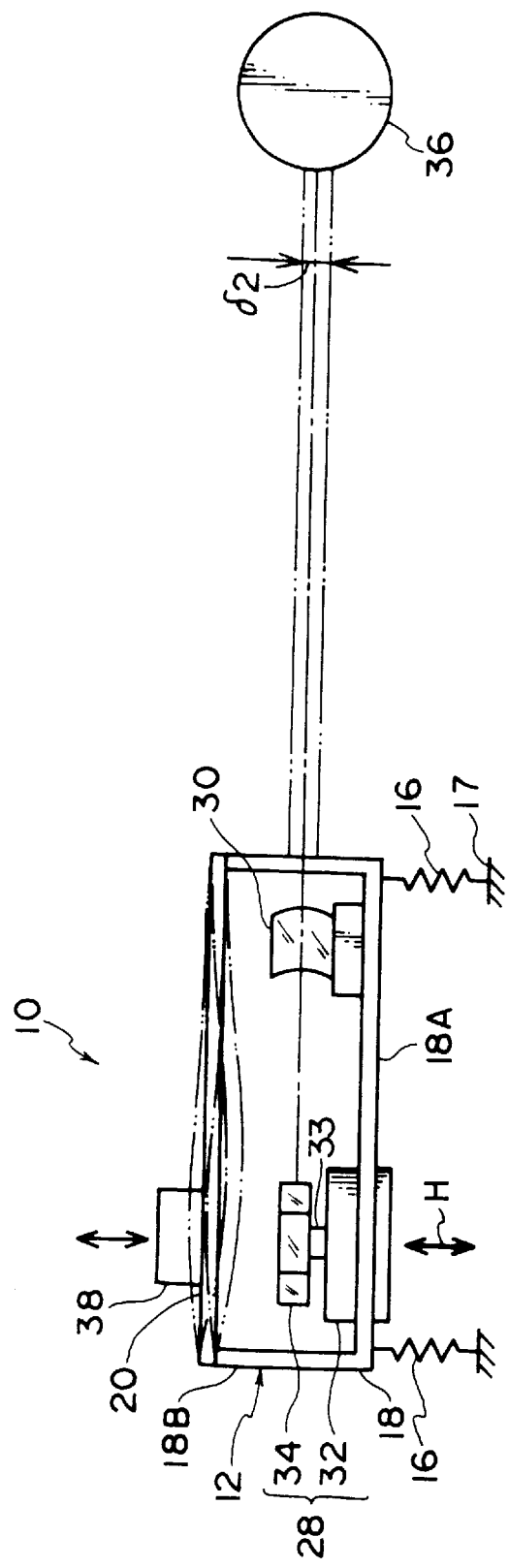

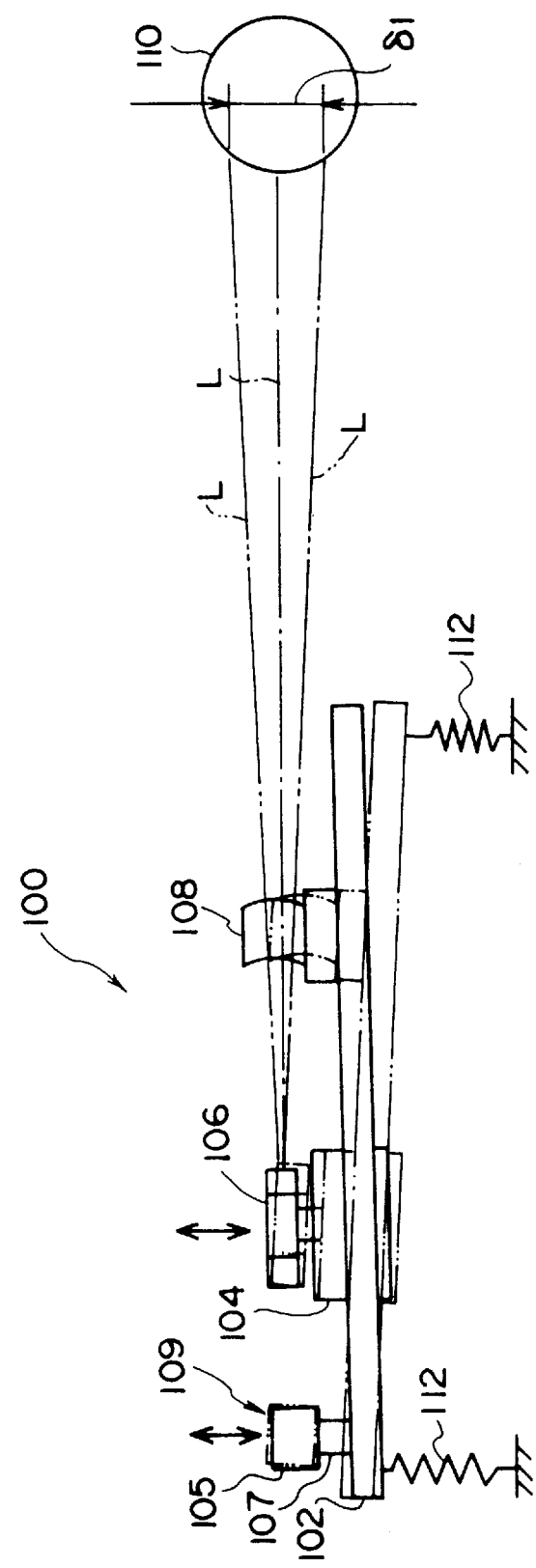

LIGHT SCANNING DEVICE

BACKGROUND OF THE INVENTION

1. Field of the Invention

The present invention relates to a light scanning device used in an image recording apparatus such as a laser printer, a laser facsimile machine, or the like.

2. Description of the Related Art

Conventionally, such light scanning devices are structured such that light modulated by an image signal is deflected and scanned by a light deflector, which is formed by a rotating polygon mirror which rotates at high speed, and is illuminated onto a photosensitive body. As a result, the deflector becomes a source of vibrations, and the optical box or the optical parts which form the light scanning device are excited and vibrate. Imperfections in the image, such as deviation of the image or irregularities in density or the like, arise due to this vibration.

Here, the means described in Japanese Patent Application Laid-Open (JP-A) No. 7-84203 for improving the above-described drawback may be implemented. As illustrated in FIG. 9, in a light scanning device 100 of JP-A-7-84203, a drive mechanism 104, a rotating polygon mirror 106, a lens system 108 and the like are disposed on a plate-shaped body 102. A dynamic vibration absorber 109 formed from a weight 105 and a viscoelastic body 107 is provided at the plate-shaped body 102. (Note that a portion of the structure is simplified in FIG. 9.)

As illustrated in FIG. 3A, a case in which an exciting force of Pcosot is applied to a mass M can be modeled by a system having two degrees of freedom in which an auxiliary vibration system m (mass) and k (spring) are attached to a main vibration system M (mass) and K (spring). K (spring) of the main vibration system corresponds to side plates 112 supporting the plate-shaped body 102.

However, it is generally known that, in a case in which the natural frequency $\upsilon=(k/m)^{1/2}$ of the auxiliary vibration system is equal to the frequency $\omega$ of the exciting force, the constant displacement amplitudes A, a of the masses M, m in the vibration system are A=0, a=-p/k.

However, in the light scanning device 100 of JP-A-7-84203, in order to form the dynamic vibration absorber 109, the weight 105 and the viscoelastic body 107, which are separate parts from the light scanning device 100, must be provided. The number of parts in the entire apparatus increases, and accordingly, the number of operations for assembly increase.

As is clear in FIG. 3B, when the relationship $\upsilon=\omega$ collapses, the vibration reducing effect of the dynamic vibration absorber weakens. More specifically, there are unavoidable manufacturing variations of the masses M, m and the springs K, k included in the main vibration system and the auxiliary vibration system. Further, because there are also variations in the frequency $\omega$ of the exciting force, in actuality, the relationship $\upsilon=\omega$ collapses, and vibrations occur in both the main vibration system and the auxiliary vibration system.

In the light scanning device 100 of JP-A-7-84203, the dynamic vibration absorber 109 is provided at a position which is separated in the horizontal direction from the drive mechanism 104 and the rotating polygon mirror 106. Therefore, when vibrations are generated in both the main vibration system and the auxiliary vibration system, as illustrated in FIG. 10, a rotation moment is generated in the entire light scanning device 100 due to the vibration of the weight 105, and a deviation $\delta 1$ in the scan position of a beam L on a photosensitive body 110 arises. Therefore, the effects which were anticipated are not achieved in actuality, and a drawback arises in that imperfections in the image arise. In particular, when the distance from the light scanning device 100 to the photosensitive body 110 is long, the deviation $\delta 1$ in the scan position increases.

SUMMARY OF THE INVENTION

In view of the aforementioned, an object of the present invention is to solve the above-described drawbacks and reliably prevent image imperfections from occurring by sufficiently reducing the vibrations of a light scanning device which is excited by a light deflector, while suppressing an increase in the number of parts.

A first aspect of the present invention is a light scanning device comprising: a light deflector deflecting and scanning light modulated by an image signal; and a member to which the light deflector is connected, wherein a portion of the member has an elastically deformable portion, a mass body is mounted to the elastically deformable portion, and a dynamic vibration absorber is formed by the elastically deformable portion and the mass body.

In the light scanning device of the first aspect, vibration of the light scanning device can be reduced by the dynamic vibration absorber which is formed by the elastically deformable portion and the mass body. Imperfections in the image which are caused by the vibration can be prevented. Further, a portion of the member is formed so as to be elastically deformable. Because this elastically deformable portion is used as a spring (k) of the dynamic vibration absorber, there is no need for a spring, a viscoelastic body or the like. Therefore, there are fewer parts than a conventional light scanning device in which the dynamic vibration absorber is structured by a spring, a viscoelastic body or the like.

In a second aspect of the present invention, in the first aspect, the mass body is positioned on a vertical line of the light deflector or in a vicinity thereof.

In the light scanning device of the second aspect, because the mass body is provided on the vertical line of the light deflector or in a vicinity thereof, it is difficult for a rotation moment to be generated at the light scanning device when the light scanning device vibrates. As a result, the only movement component in the vibration of the light scanning device is in a direction parallel to the optical axis, and there are only scanning deviations in this direction. Therefore, imperfections in the image can be kept to a minimum.

A plurality of mass bodies may be used. In this case, the overall center of gravity position of the mass bodies is positioned on the vertical line of the light deflector or in a vicinity of the vertical line.

In the third aspect of the present invention, in the light scanning device of either the first or second aspect, at least one of the light deflector and the mass body is provided at the center of gravity of the light scanning device or in a vicinity thereof.

In the light scanning device of the third aspect, the at least one of the light deflector and the mass body is provided at the center of gravity position of the light scanning device or in a vicinity thereof. Therefore, it is difficult for a rotation moment to be generated at the light scanning device when the light scanning device vibrates. As a result, the only movement component in the vibration of the light scanning device is in a direction parallel to the optical axis, and there are only scanning deviations in this direction. Therefore, imperfections in the image can be kept to a minimum.

A plurality of mass bodies may be used. In this case, the overall center of gravity position of the mass bodies is positioned at the center of gravity position of the light scanning device or in a vicinity of the center of gravity position.

A fourth aspect of the present invention is a light scanning device comprising: a light deflector deflecting and scanning light modulated by an image signal; a member to which the light deflector is connected; and an elastic body interposed between the light deflector and the member, wherein a dynamic vibration absorber is formed by the light deflector and the elastic body.

In the light scanning device of the fourth aspect, vibrations of the light scanning device are reduced by the dynamic vibration absorber which is formed by the light deflector and the elastic body. Image imperfections caused by the vibrations can be prevented. Further, because the light deflector is used as the mass body (m) of the dynamic vibration absorber, there is no need to provide a mass body such as a weight or the like. Fewer parts can be used than in a conventional light scanning device in which a weight is needed to form the dynamic vibration absorber.

A fifth aspect of the present invention is a light scanning device comprising: a light deflector deflecting and scanning light modulated by an image signal; and a member to which the light deflector is connected, wherein the light deflector includes a fixed portion mounted to the member and a rotating portion rotating with respect to the fixed portion, and elastic means is interposed between the rotating portion and the fixed portion, and a dynamic vibration absorber is formed by the rotating portion and the elastic means.

In the light scanning device of the fifth aspect, vibrations of the light scanning device can be reduced by the dynamic vibration absorber which is formed by the rotating portion and the elastic means. Image imperfections caused by the vibration can be prevented. Further, because the rotating portion is used as the mass body (m) of the dynamic vibration absorber, fewer parts can be used than in a conventional light scanning device in which a weight is needed to form the dynamic vibration absorber.

BRIEF DESCRIPTION OF THE DRAWINGS

FIG. 1 is a perspective view of a light scanning device relating to a first embodiment of the present invention.

FIG. 2 is a side view of the light scanning device.

FIG. 10 is a side view at a time when a conventional light scanning device vibrates.

DESCRIPTION OF THE PREFERRED EMBODIMENTS

First Embodiment

Figure 3B:
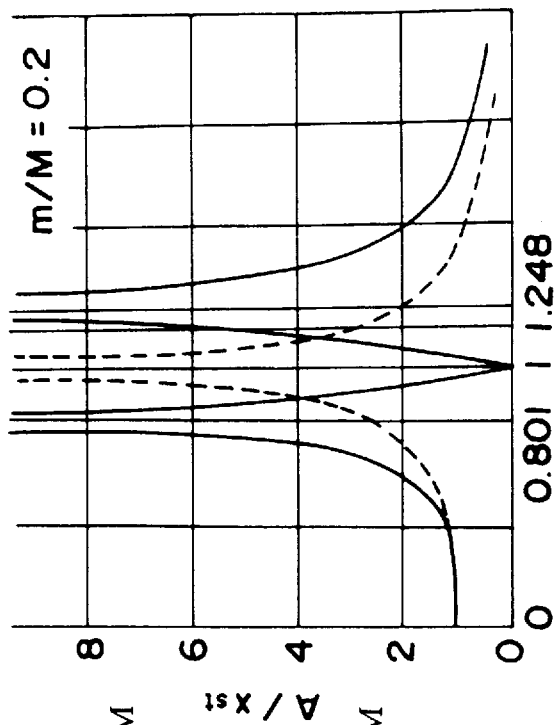
FIG. 3B is a graph illustrating a resonance curve of a main vibration system in the schematic view of the vibration systems of FIG. 3A.

A first embodiment of the present invention will be described hereinafter with reference to the drawings.

FIG. 1 is a perspective view which summarily illustrates the structure of a light scanning device 10 to which the present invention is applied.

As illustrated in FIGS. 1 and 2, the light scanning device 10 is provided with an optical box 12. The optical box 12 is formed by an optical box main body 18, whose top portion and a portion of whose side portions are open, and a cover body 20, which closes the upper portion opening portion of the optical box main body 18.

As illustrated in FIG. 2, in the light scanning device 10, the optical box 12 is supported on a fixed portion 17, such as a floor surface or the like, by side plates 16 which are modeled by coil springs.

As shown in FIG. 1, parts such as a light source 22 which emits laser light, a collimator lens 24, a cylindrical lens 26, a light deflector 28, a condenser lens 30 and the like are mounted to a bottom plate 18A of the optical box main body 18.

As shown in FIG. 2, the light deflector 28 is formed by a drive mechanism 32, which is formed by a motor or the like, and a rotating polygon mirror 34, which is mounted to the rotating shaft (not shown) of the drive mechanism 32 and is rotated at a high speed by the drive mechanism 32.

As shown in FIG. 1, the collimator lens 24 collimates the bundle of light beams emitted from the light source 22. Due to the driving of the light source 22 in accordance with an image information signal, the bundle of light beams which passes through the collimator lens 24 becomes a collimated bundle of light beams corresponding to the image information. This bundle of light beams passes through the cylindrical lens 26, and thereafter, is deflected by the rotating polygon mirror 34. The deflected bundle of light beams is condensed by the condenser lens 30, and is focused on a photosensitive body 36 which is a surface-to-be-scanned and which is disposed at a position which is separated from the light scanning device 10 by a predetermined distance.

At this time, the condenser lens 30 scans such that the scanning speed on the photosensitive body 36 is a uniform velocity, and corrects the deviation in the scan position on the photosensitive body 36 caused by the variations in the tilt of the reflecting surfaces of the rotating polygon mirror 34. In this way, a latent image corresponding to the aforementioned information is formed on the photosensitive body 36.

Known image forming processing machines (unillustrated), such as known charging means, developing means, transfer means, cleaning means and the like, are disposed at the periphery of the photosensitive body 36. The members forming the light scanning device are positioned and fixed integrally by the optical box 12.

As illustrated in FIG. 2, the cover body 20 of the optical box main body 18 of the present first embodiment is formed from an elastically deformable plate member such as a metal plate, a resin plate, a hard rubber plate or the like. The periphery of the cover body 20 is fixed (by screwing or the like) to the upper edges of side walls 18B of the optical box main body 18. A weight 38, which serves as a mass body, is fixed to the outer surface of the cover body 20 on a vertical line which passes through the axial center of the light deflector 28.

Figure 3A:
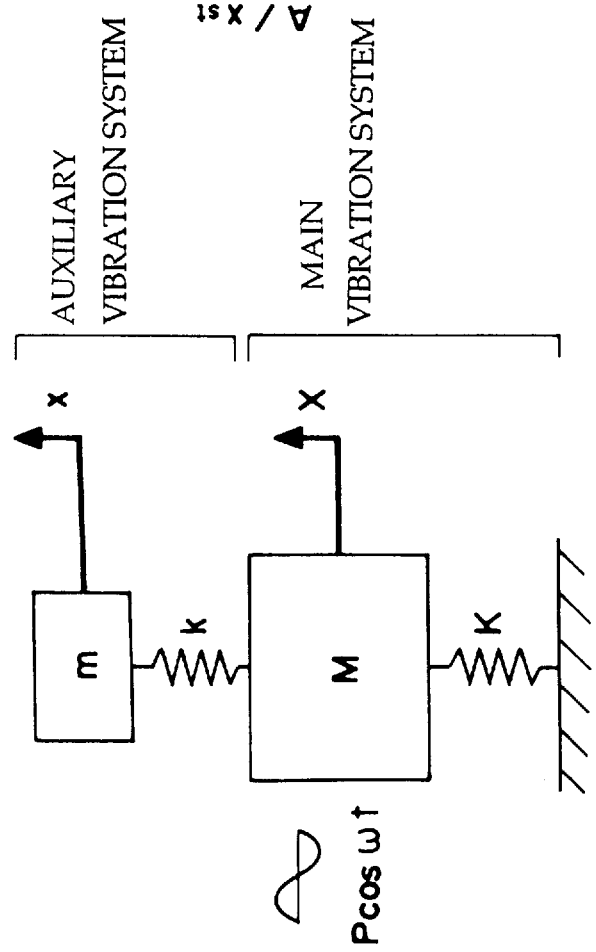
FIG. 3A is a schematic view of vibration systems.

Here, the cover body 20 corresponds to the spring k of the vibration systems illustrated in FIG. 3A, the weight 38 corresponds to the mass m, the side plates 16 correspond to the spring K, and the optical box 12 corresponds to the mass M. A dynamic vibration absorber is formed by the cover body 20 and the weight 38.

The mass of the weight 38 and the spring constant of the cover body 20 are determined by the mass of the light scanning device 10 and the spring constant and the coefficient of viscosity of the side plates 16 modeled by the coil springs.

The spring constant of the cover body 20 may be varied by varying the material such as metal, resin or the like, or may be varied by varying the thickness or the configuration of the cover body 20. Further, the spring constant of the elastically deforming portion supporting the weight 38 can be varied by forming slits or the like in the cover body 20.

Next, operation of the present first embodiment will be described.

Because the rotating polygon mirror 34 rotates at high speeds reaching several tens of thousands of rotations per minute, due to this high speed rotation, the optical box 12 is excited and vibrates in the direction illustrated by arrow H in FIG. 2 (in the direction orthogonal to the fixed portion 17 which is a floor surface or the like). However, because this vibration is suppressed by the dynamic vibration absorber which is formed by the cover body 20 and the weight 38, the generation of image imperfections at the light scanning device 10 can be prevented.

Even if the spring constant of the cover body 20, the mass of the weight 38 or the like deviate from optimal values, because the weight 38 and the light deflector 28 are substantially coaxial, the generation of a rotation moment which is about to be generated at the light scanning device 10 can be suppressed. As a result, because a deviation 62 in the scan position on the photosensitive body 36 only effects the parallel movement component, the generation of imperfections in the image can be kept to a minimum.

Figure 4:
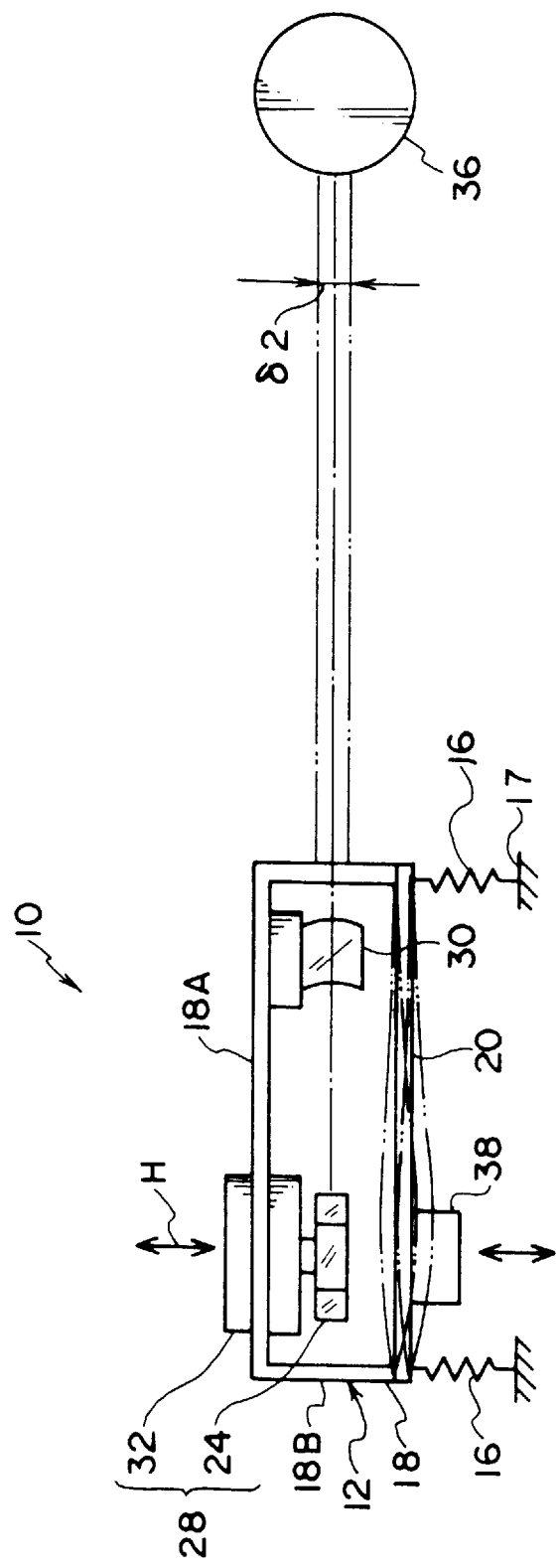
FIG. 4 is a modified example of the light scanning device relating to the first embodiment.

As illustrated in FIG. 4, the optical box 12 may be disposed upside-down with respect to the arrangement illustrated in FIG. 2. In this case as well, vibration of the optical box 12 can be suppressed.

A plurality of weights 38 may be mounted at arbitrary positions of the cover body 20, provided that the function of the mass body of the dynamic vibration absorber is realized. In this case, the overall center of gravity position of the plurality of weights 38 may be positioned on the vertical line which passes through the axial center of the light deflector 28.

Second Embodiment

Figure 5:
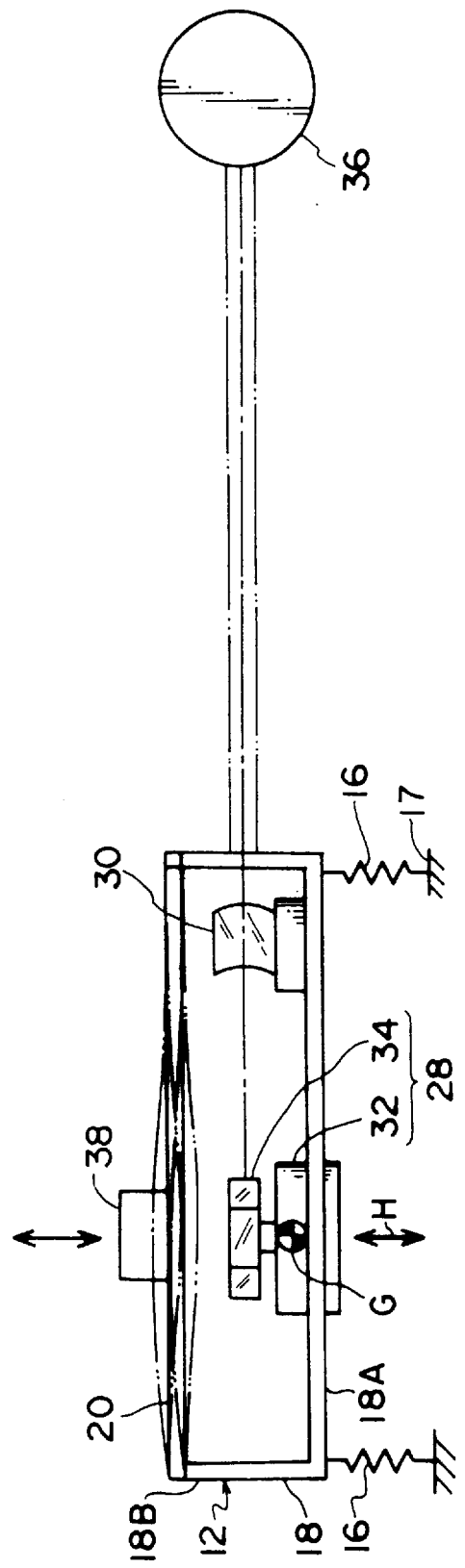
FIG. 5 is a side view illustrating a light scanning device relating to a second embodiment of the present invention.

A second embodiment of the present invention will now be described in accordance with FIG. 5. Structures which are the same as those of the first embodiment are denoted by the same reference numerals, and description thereof is omitted.

In the light scanning device 10 of the second embodiment, the light deflector 28 and the weight 38 are provided in a vicinity of the center of gravity position G of the light scanning device 10.

In the present second embodiment, the weight 38, which serves as the vibrating mass body, is provided in a vicinity of the center of gravity position G of the light scanning device 10. Therefore, as compared with the first embodiment, it is even more difficult for a rotation moment 10 to be generated at the light scanning device 10, and a strong effect of preventing the generation of imperfections in the image is achieved.

Third Embodiment

A third embodiment of the present invention will be described hereinafter with reference to FIG. 6. Structures which are the same as those of the above-described embodiments are denoted by the same reference numerals, and description thereof is omitted.

Figure 6:
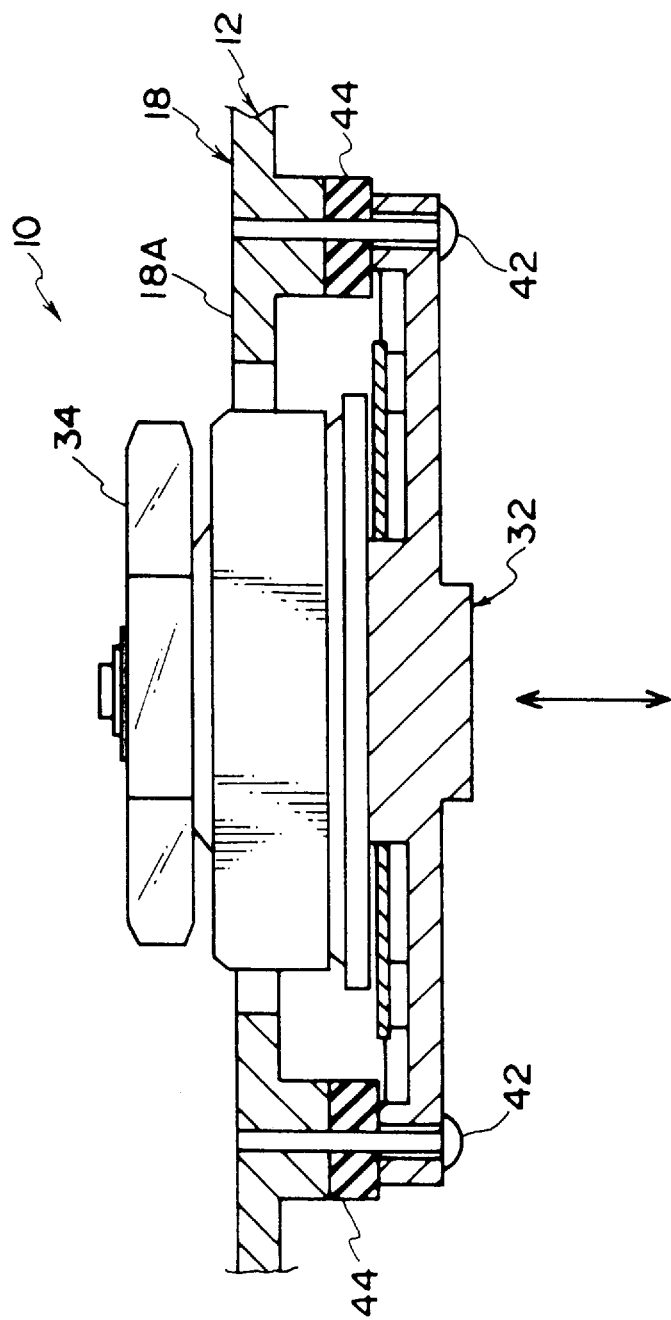
FIG. 6 is a cross-sectional view of main portions of a light scanning device relating to a third embodiment of the present invention.

As illustrated in FIG. 6, the drive mechanism 32 is supported by screws 42 as if to be hanging down from the bottom plate 18A. An elastic body 44 formed from rubber, urethane or the like is disposed between the bottom plate 18A and the drive mechanism 32.

In the present third embodiment, the elastic body 44 corresponds to the spring k of the vibration system illustrated in FIG. 3A, the rotating polygon mirror 34 and the drive mechanism 32 correspond to the mass m, the side plates 16 correspond to the spring K, and the optical box 12 corresponds to the mass M. The dynamic vibration absorber is formed by the elastic body 44, the rotating polygon mirror 34 and the drive mechanism 32.

Here, the mass of the rotating polygon mirror 34 and the drive mechanism 32 and the spring constant of the elastic body 44 are determined by the mass of the light scanning device 10 and the spring constant and the coefficient of viscosity of the side plates 16 modeled by the coil springs. The spring constant of the elastic body 44 can be varied by varying the hardness thereof or by varying the size or the configuration thereof.

In the present third embodiment, vibration of the optical box 12 is suppressed by the dynamic vibration absorber formed by the rotating polygon mirror 34, the drive mechanism 32 and the elastic body 44.

The drive mechanism 32 may be disposed on the top surface of the bottom plate 18A via the elastic body 44. Further, the drive mechanism 32 and the bottom plate 18A may be connected by using a metal spring as the elastic body 44 in place of rubber or the like.

It suffices to connect the drive mechanism 32 and the bottom plate 18A only by the elastic body 44, without using the screws 42. In this case, the drive mechanism 32 and the elastic body 44, and the elastic body 44 and the bottom plate 18A may be connected together by an adhesive or the like.

If the rotating polygon mirror 34 and the drive mechanism 32 (mass) are supported elastically, a dynamic vibration absorber can be formed. Therefore, a portion of the drive mechanism 32 may be formed thin and elastically deformable. In this way, the elastic body 44 can be omitted.

In the present third embodiment, it is preferable that the center of gravity position of the rotating polygon mirror 34 and the drive mechanism 32 is provided at the center of gravity position of the light scanning device 10 or in a vicinity thereof.

Fourth Embodiment

A fourth embodiment of the present invention will be described hereinafter in accordance with FIG. 7. Structures which are the same as those of the above-described embodiments are denoted by the same reference numerals, and description thereof is omitted.

Figure 7:
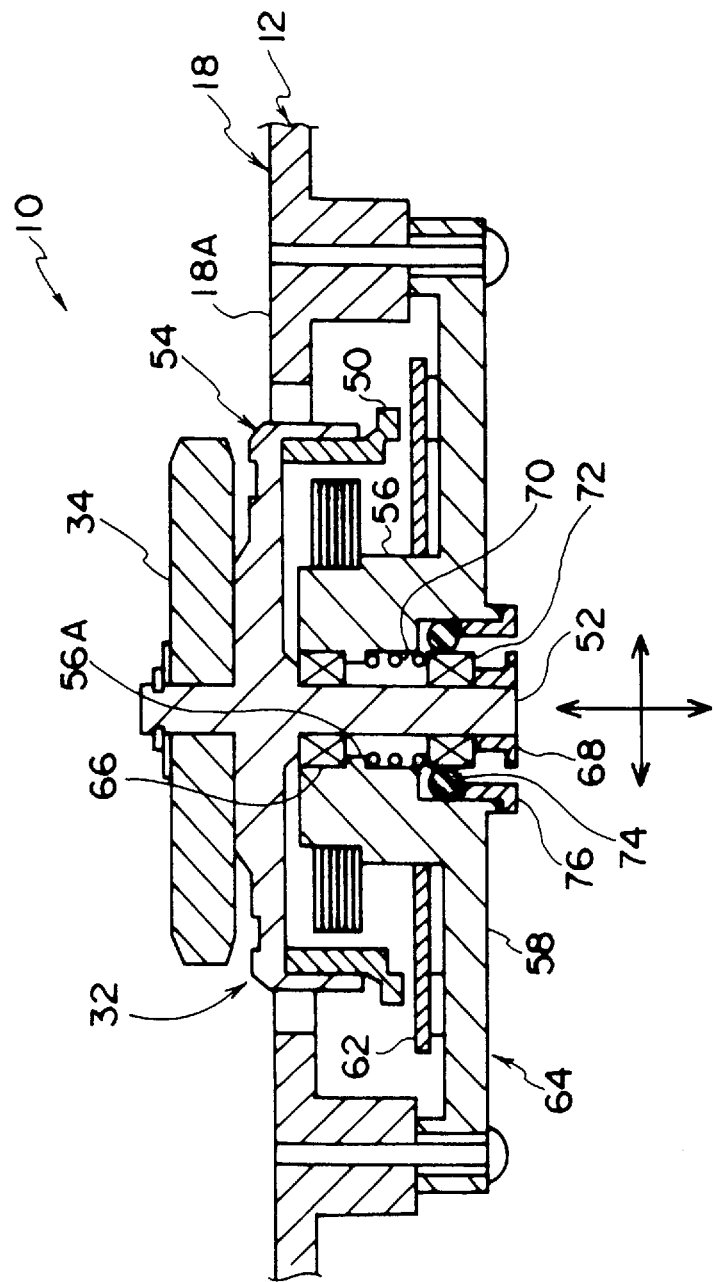
FIG. 7 is a cross-sectional view of main portions of a light scanning device relating to a fourth embodiment of the present invention.

As shown in FIG. 7, the drive mechanism 32 is provided with a rotating portion 54 and a fixed portion 64. The rotating portion 54 is formed by a magnet 50, a drive shaft 52 and the like. The fixed portion 64 is formed by a frame 58 formed integrally with a shaft receiving portion 56, a base plate 62 to which an unillustrated coil is mounted, and the like.

A bearing 66 is press-fit into the upper portion of the shaft receiving portion 56. The rotating shaft 52 is inserted into the bearing 66 from above. The rotating shaft 52 is slidable in the axial direction with respect to the bearing 66.

A stopper ring 68 is fixed to the bottom end of the rotating shaft 52. A compression coil spring 70 and a bearing 72 are disposed between the stopper ring 68 and a step portion 56A of the shaft receiving portion 56. The rotating shaft 52 is inserted into the inner ring of the bearing 72, and the compression coil spring 70 urges the outer ring of the bearing 72 downward.

An annular elastic body 74 (e.g., a rubber O-ring) is disposed between the shaft receiving portion 56 and the outer ring of the lower bearing 72. A stopper 76, which prevents the elastic body 74 from falling out, is mounted to the shaft receiving portion 56.

In the present fourth embodiment, the elastic body 74 and the compression coil spring 70 form an elastic means and correspond to the spring k of the vibration systems illustrated in FIG. 3A. The rotating portion 54 and the rotating polygon mirror 34 correspond to the mass m, the side plates 16 (unillustrated) correspond to the spring K, and the optical box 12 and the fixed portion 64 correspond to the mass M. The dynamic vibration absorber is formed by the elastic body 74, the compression coil spring 70, the rotating portion 54 and the rotating polygon mirror 34.

In the present fourth embodiment, vibration of the optical box 12 is suppressed by the dynamic vibration absorber formed by the elastic body 74, the compression coil spring 70, the rotating portion 54 and the rotating polygon mirror 34.

An elastic body (a rubber O-ring or the like) may be disposed between the upper bearing 66 and the shaft receiving portion 56, and the rotating portion 54 may be supported by all of the elastic members (the elastic members, the spring, and the like).

In the present fourth embodiment as well, it is preferable that the center of gravity position of the rotating polygon mirror 34 and the drive mechanism 32 is provided at the center of gravity position of the light scanning device 10 or in the vicinity thereof.

Figure 8:
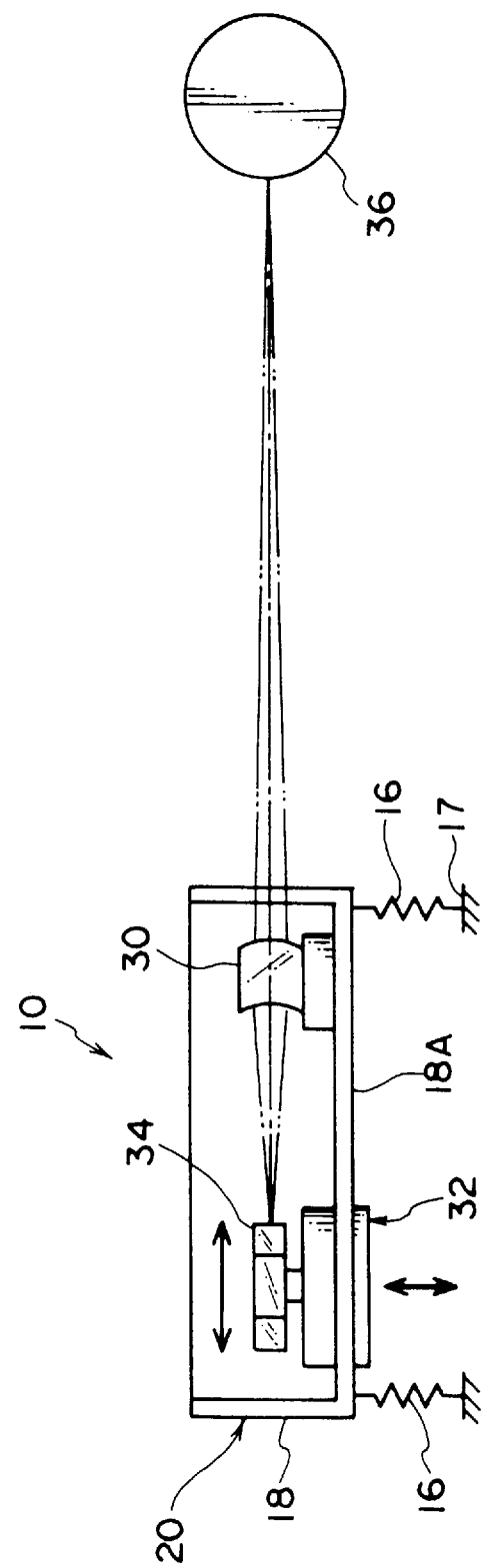
FIG. 8 is an explanatory view for explaining a tilt correcting optical system.
Figure 9:
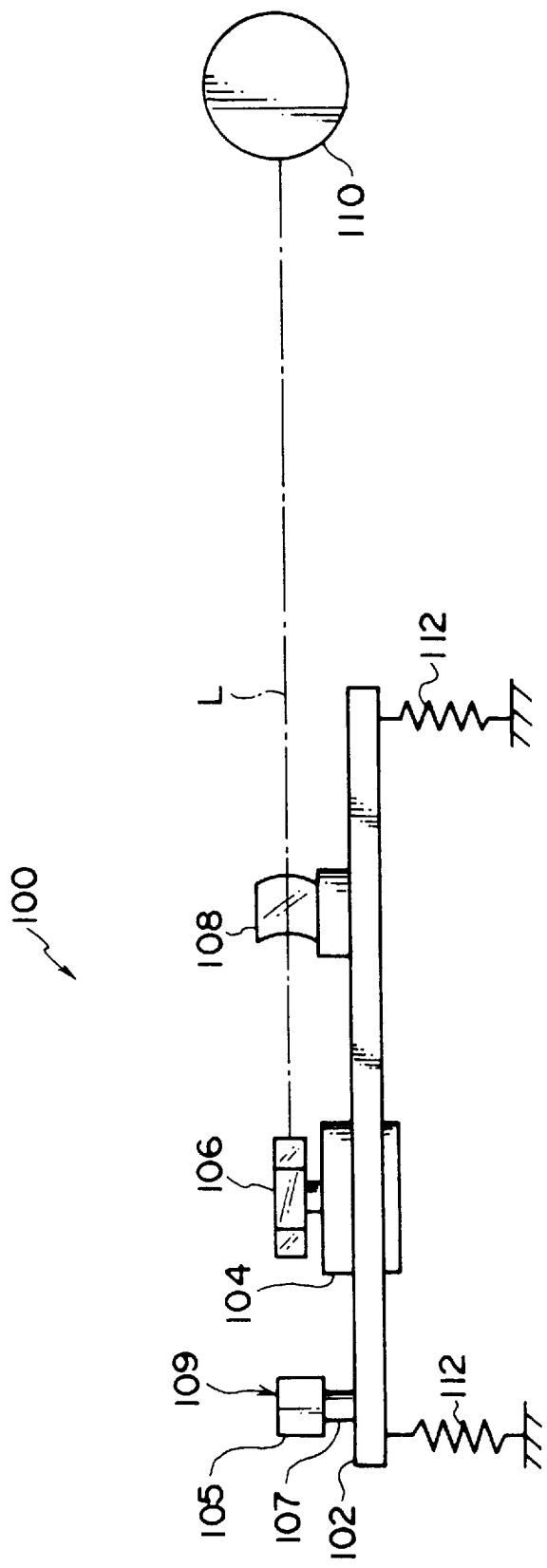
FIG. 9 is a side view of a conventional light scanning device.

In the third and fourth embodiments, the optical axis of the bundle of light beams deflected by the rotating polygon mirror 34 may tilt as shown in FIG. 8 due to the vibration of the rotating polygon mirror 34. However, this tilting can be corrected by the condenser lens 30, and consequently does not present a problem.

What is claimed is:

1. A light scanning device comprising:
   a light deflector for deflecting and scanning light modulated by an image signal; and
   a member to which said light deflector is connected,
   wherein said member has an elastically deformable portion, a mass body is mounted to said elastically deformable portion and disposed in substantially coaxial alignment with said light deflector, and a dynamic vibration absorber is formed by said elastically deformable portion and said mass body.

2. A light scanning device according to claim 1, wherein said mass body is positioned above said light deflector.

3. A light scanning device according to claim 1, wherein said mass body is positioned below said light deflector.

4. A light scanning device according to claim 1, wherein said elastically deformable portion is a plate member.

5. A light scanning device according to claim 4, wherein said light deflector includes a rotating polygon mirror and a drive mechanism which drives and rotates said rotating polygon mirror, and said member is formed as a box in which said rotating polygon mirror is disposed, and said plate member is a portion of said box.

6. A light scanning device according to claim 5, wherein said plate member is disposed above said rotating polygon mirror.

7. A light scanning device comprising:
   a pair of spaced plates, at least one of the pair of plates having an elastically deformable portion;
   at least one side plate disposed between the pair of spaced plates;
   a light deflector for deflecting and scanning light modulated by an image signal, the light deflector being positioned on the other plate of the pair of spaced plates; and
   a mass body, the mass body being positioned on the elastically deformable portion of the one plate to form a dynamic vibration absorber.

8. The light scanning device according to claim 7, wherein the pair of plates are positioned substantially vertical in the light scanning device.

9. The light scanning device according to claim 7, wherein the one plate is positioned above the other plate.

10. The light scanning device according to claim 7, wherein the one plate is positioned below the other plate.

11. The light scanning device according to claim 7, wherein the mass body is aligned substantially coaxial with said light deflector.

12. The light scanning device according to claim 7, wherein the at least one side plate is a plurality of side plates, the side plates disposed between the pair of plates to form a box having at least one opening.

* * * * *